US009897439B2

(12) United States Patent
Hu et al.

(10) Patent No.: US 9,897,439 B2
(45) Date of Patent: Feb. 20, 2018

(54) METHOD AND TERMINAL FOR MEASURING ANGLE

(71) Applicant: Xiaomi Inc., Beijing (CN)

(72) Inventors: Xiaowei Hu, Beijing (CN); Wei Han, Beijing (CN); Yin Zhu, Beijing (CN)

(73) Assignee: Xiaomi Inc., Beijing (CN)

( * ) Notice: Subject to any disclaimer, the term of this patent is extended or adjusted under 35 U.S.C. 154(b) by 370 days.

(21) Appl. No.: 14/616,919

(22) Filed: Feb. 9, 2015

(65) Prior Publication Data

US 2015/0338211 A1 Nov. 26, 2015

Related U.S. Application Data

(63) Continuation of application No. PCT/CN2014/089270, filed on Oct. 23, 2014.

(30) Foreign Application Priority Data

May 26, 2014 (CN) .......................... 2014 1 0225638

(51) Int. Cl.
*H04N 7/18* (2006.01)
*G01B 11/26* (2006.01)
(Continued)

(52) U.S. Cl.
CPC ............ *G01B 11/26* (2013.01); *G06K 9/3275* (2013.01); *G06K 9/52* (2013.01); *G06K 9/00671* (2013.01)

(58) Field of Classification Search
CPC ........ G01B 11/26; G06K 9/3275; G06K 9/52; G06K 9/00671
(Continued)

(56) References Cited

U.S. PATENT DOCUMENTS 6,104,864 A * 8/2000 Kondo .................. H04N 7/188
348/137
7,593,627 B2 9/2009 Wernersson
(Continued)

FOREIGN PATENT DOCUMENTS

CN 2478297 Y 2/2002
CN 1630304 A 6/2005
(Continued)

OTHER PUBLICATIONS

International Search Report of PCT/CN2014/089270, from the State Intellectual Property Office of China, dated Jan. 28, 2015.
(Continued)

*Primary Examiner* — Robert Chevalier
(74) *Attorney, Agent, or Firm* — Finnegan, Henderson, Farabow, Garrett & Dunner LLP (57) ABSTRACT

A method for a terminal to measure an angle, includes: displaying a horizontal reference line, a measurement line, and an object being imaged by a camera on a display interface of the terminal, a plane determined by the measurement line and the horizontal reference line being parallel with the display interface, and the measurement line being relatively static with respect to the display interface; during a process in which the terminal is turned to cause, on the display interface, an edge of the object to be parallel with the measurement line, obtaining one or more angles between the measurement line and the horizontal reference line; and determining an angle obtained when the edge of the object is parallel with the measurement line as an angle between the object and a horizontal plane.

14 Claims, 9 Drawing Sheets

(51) Int. Cl.
*G06K 9/52* (2006.01)
*G06K 9/32* (2006.01)
*G06K 9/00* (2006.01)

(58) Field of Classification Search
USPC .............................. 348/141, 135, 140, 143
See application file for complete search history.

(56) References Cited

U.S. PATENT DOCUMENTS

| | | | |
|---|---|---|---|
| 8,442,621 B2* | 5/2013 | Gorek | A61B 17/7091 600/424 |
| 2005/0117024 A1 | 6/2005 | Lee | |
| 2008/0204565 A1 | 8/2008 | Yumiki | |

FOREIGN PATENT DOCUMENTS

| | | |
|---|---|---|
| CN | 103398698 A | 11/2013 |
| CN | 103499341 A | 1/2014 |
| CN | 104034309 A | 9/2014 |
| EP | 1 154 314 A2 | 11/2001 |
| EP | 1 377 038 A2 | 1/2004 |
| JP | 2002-271654 A | 9/2002 |
| JP | 2006-165941 A | 6/2006 |
| JP | 2008-028728 A | 2/2008 |
| JP | 2008-061083 A | 3/2008 |
| JP | 2009-077226 A | 4/2009 |
| JP | 2010-114941 A | 5/2010 |
| JP | 2013-030122 A | 2/2013 |
| KR | 10-2005-0052155 A | 6/2005 |
| TW | 201137318 A | 11/2011 |
| WO | WO 1993/00607 | 1/1993 |

OTHER PUBLICATIONS

European Search Report for European Application No. 15169069 dated Sep. 24, 2015.
English version of International Search Report of PCT/CN2014/089270, from the State Intellectual Property Office of China, dated Jan. 28, 2015.
Russian Office Action for Russian Application No. 2014154153/28 dated Apr. 21, 2016.

* cited by examiner

METHOD AND TERMINAL FOR MEASURING ANGLE

CROSS-REFERENCE TO RELATED APPLICATIONS

This application is a Continuation Application of International Application No. PCT/CN2014/089270, filed Oct. 23, 2014, which is based upon and claims priority to Chinese Patent Application No. CN201410225638.5, filed May 26, 2014, the entire contents all of which are incorporated herein by reference.

TECHNICAL FIELD

The present disclosure generally relates to the field of computer technology and, more particularly, to a method and a terminal for measuring an angle.

BACKGROUND

With the development of terminal technology, terminals have increasingly versatile functions. For example, a gradienter application (APP) may be installed on a terminal, to detect whether the terminal is at a horizontal level.

Conventionally, when an angle between the terminal and a horizontal plane is to be measured by the gradienter APP, the gradienter APP is initiated by the terminal, and a measurement interface provided by the gradienter APP is displayed on the terminal. For example, the measurement interface displays images showing liquid and a bubble in a container. During a movement of the terminal, the measurement interface displays that the bubble keeps moving with the terminal. The angle between the terminal and the horizontal plane is determined to be 0 if the bubble is displayed to be located in a middle of the container.

SUMMARY

According to a first aspect of the present disclosure, there is provided a method for a terminal to measure an angle, comprising: displaying a horizontal reference line, a measurement line, and an object being imaged by a camera on a display interface of the terminal, a plane determined by the measurement line and the horizontal reference line being parallel with the display interface, and the measurement line being relatively static with respect to the display interface; during a process in which the terminal is turned to cause, on the display interface, an edge of the object to be parallel with the measurement line, obtaining one or more angles between the measurement line and the horizontal reference line; and determining an angle obtained when the edge of the object is parallel with the measurement line as an angle between the object and a horizontal plane.

According to second aspect of the present disclosure, there is provided a terminal, comprising: a processor; and a memory configured to store instructions executable by the processor; wherein the processor is configured to: display a horizontal reference line, a measurement line, and an object being imaged by a camera on a display interface of the terminal, a plane determined by the measurement line and the horizontal reference line being parallel with the display interface, and the measurement line being relatively static with respect to the display interface; during a process in which the terminal is turned to cause, on the display interface, an edge of the object to be parallel with the measurement line, obtaining one or more angles between the measurement line and the horizontal reference line; and determining an angle obtained when the edge of the object is parallel with the measurement line as an angle between the object and a horizontal plane.

According to a third aspect of the present disclosure, there is provided a non-transitory computer-readable storage medium having stored therein instructions that, when executed by a processor of a terminal, cause the terminal to perform a method for measuring an angle, the method comprising: displaying a horizontal reference line, a measurement line, and an object being imaged by a camera on a display interface of the terminal, a plane determined by the measurement line and the horizontal reference line being parallel with the display interface, and the measurement line being relatively static in respect to the display interface; during a process in which the terminal is turned to cause, on the display interface, an edge of the object to be parallel with the measurement line, obtaining one or more angles between the measurement line and the horizontal reference line; and determining an angle obtained when the edge of the object is parallel with the measurement line as an angle between the object and a horizontal plane.

It should be understood that, the general description above and the detailed description below are only exemplary, and do not limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
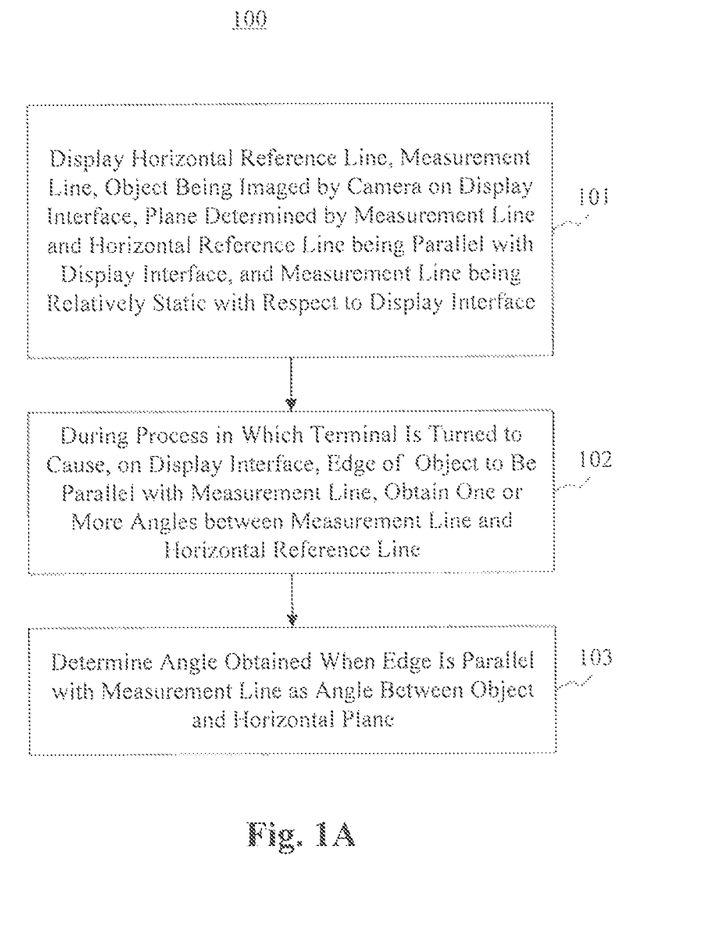
FIG. 1A is a flow chart of a method for measuring an angle, according to an exemplary embodiment.

FIG. 1A is a flow chart of a method 100 for measuring an angle, according to an exemplary embodiment. For example, the method 100 may be used by a terminal including a camera. Referring to FIG. 1, the method 100 includes the following steps.

In step 101, a horizontal reference line, a measurement line, and an object being imaged by the camera are displayed on a display interface of the terminal. For example, a plane determined according to the measurement line and the horizontal reference line is parallel with the display interface, and the measurement line is relatively static with respect to the display interface.

In exemplary embodiments, the horizontal reference line is a reference line configured to indicate a horizontal direction and keeps horizontal. The measurement line is configured to measure an angle between an object and a horizontal plane and turns with the terminal. In the illustrated embodiment, the measurement line is relatively static with respect to the display interface.

Figure 1B:
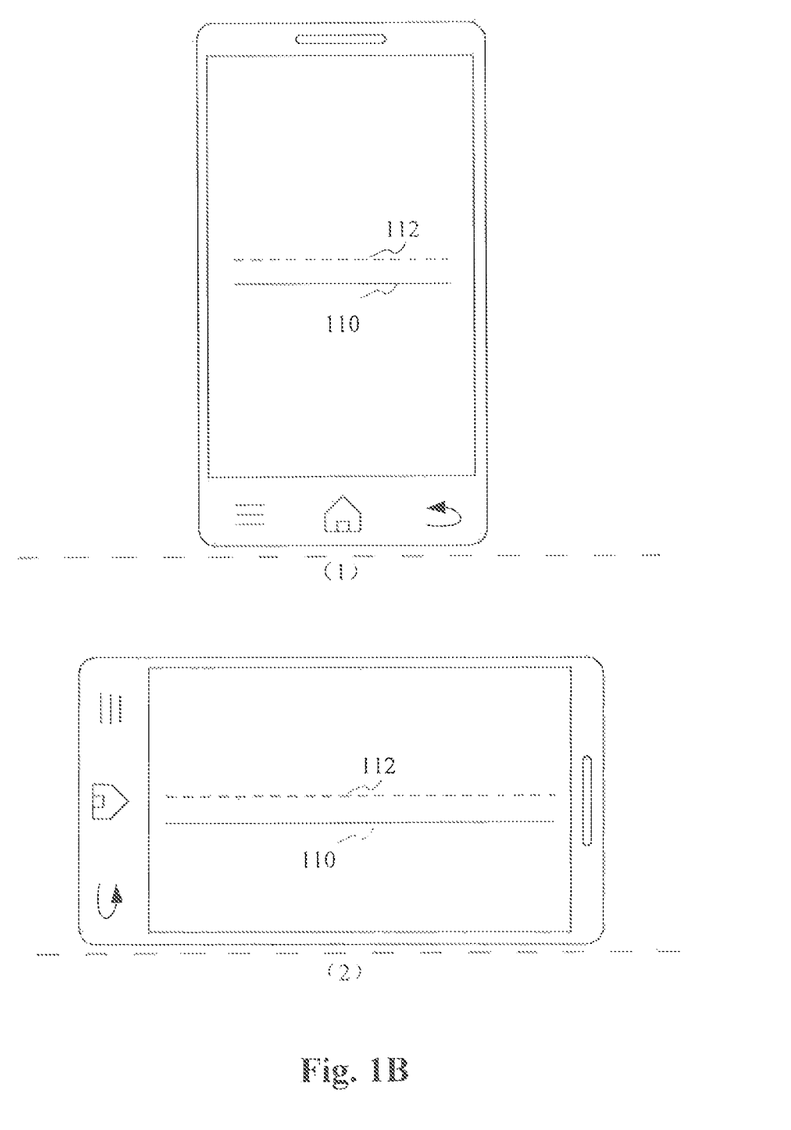
FIG. 1B shows schematic views of a horizontal reference line and a measurement line, according to an exemplary embodiment.

FIGS. 1B (1) and (2) are schematic views showing a horizontal reference line 110 and a measurement line 112 on the display interface, according to an exemplary embodiment. Referring to FIGS. 1B (1) and (2), the measurement line 112 is parallel with a side of the terminal. Since the side of the terminal is parallel with a horizontal plane and the measurement line 112 is parallel with the side of the terminal, the measurement line 112 is parallel with the horizontal reference line 110. For example, FIG. 1B (1) shows the display interface of the terminal in a portrait orientation, when the terminal is, e.g., a mobile phone, and FIG. 1B (2) shows the display interface of the terminal in a landscape orientation, when the terminal is, e.g., a tablet. In FIGS. 1B (1) and (2), the horizontal reference line 110 is represented by a solid line, the measurement line 112 is represented by a dashed line, and the horizontal plane is represented by a dash dotted line.

Figure 1C:
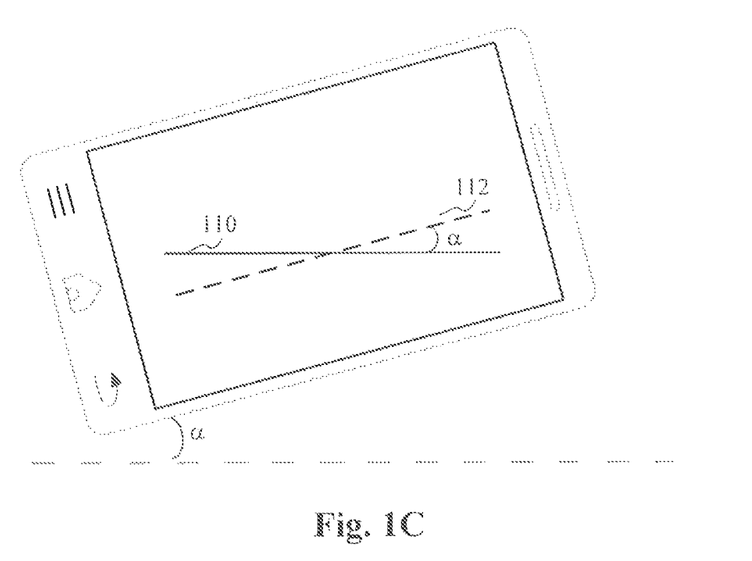
FIG. 1C is a schematic view showing a horizontal reference line and a measurement line, according to an exemplary embodiment.

FIG. 1C is a schematic view showing the horizontal reference line 110 and the measurement line 112 during measurement, according to an exemplary embodiment. There is an angle α between a long side of the terminal and the horizontal plane. Because the measurement line 112 is parallel with the long side of the terminal, the same angle α is between the measurement line 112 and the horizontal reference line 110.

Referring back to FIG. 1A, in step 102, during a process in which the terminal is turned to cause, on the display interface, an edge of the object to be parallel with the measurement line, one or more angles between the measurement line and the horizontal reference line are obtained.

In exemplary embodiments, the measurement line is relatively static with respect to the display interface and the horizontal reference line keeps horizontal. Therefore, during the turning of the terminal, an angle is formed between the measurement line and the horizontal reference line, and the angle is obtained.

In step 103, an angle obtained when the edge is parallel with the measurement line is determined as an angle between the object and the horizontal plane.

In exemplary embodiments, when the measurement line is parallel with the edge of the object, the angle between the measurement line and the horizontal reference line is equal to the angle between the object and the horizontal plane. Thus, the terminal determines the angle obtained when the edge of the object is parallel with the measurement line as the angle between the object and the horizontal plane.

Figure 2A:
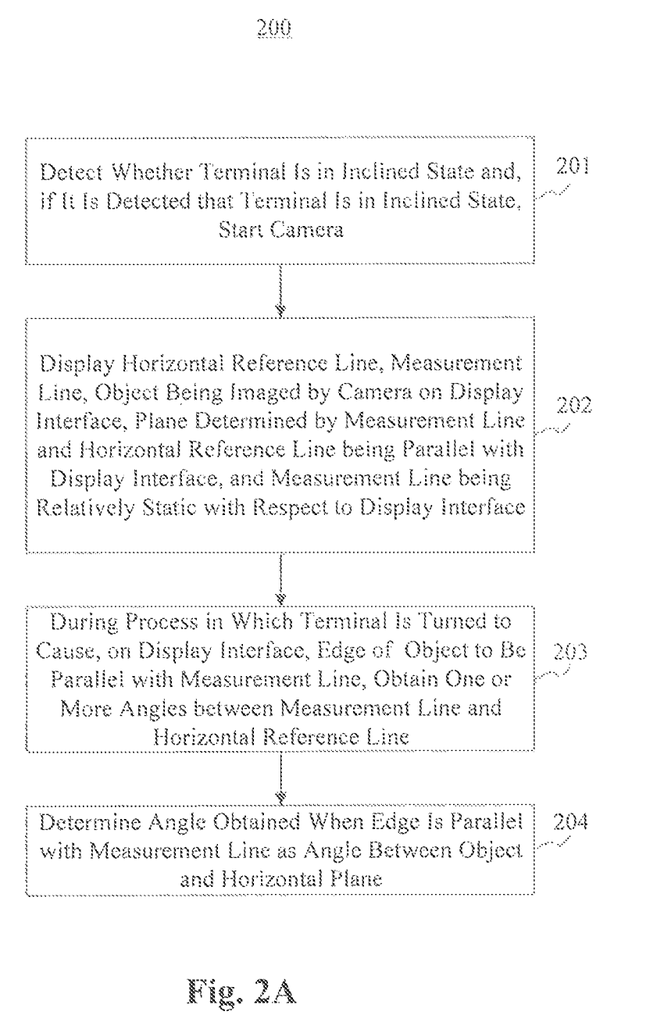
FIG. 2A is a flow chart of a method for measuring an angle, according to another exemplary embodiment.

FIG. 2A is a flow chart of a method 200 for measuring an angle, according to an exemplary embodiment. In the illustrated embodiment, an application (APP) installed on a terminal having a camera is used to measure an angle between the terminal and a horizontal plane. Referring to FIG. 2A, the method 200 includes the following steps.

In step 201, it is detected whether the terminal is in an inclined state and, if it is detected that the terminal is in the inclined state, the camera is started.

In the illustrated embodiment, the terminal is aligned with an object to measure an angle of the object. If there is no angle between the terminal and the horizontal plane, it indicates that the object to be measured by the terminal is in the horizontal plane, and an angle between the object and the horizontal plane is 0°. Therefore, no angle measurement will be needed by the terminal. In order to avoid the waste of resources by triggering a process of an angle measurement when there is no angle measurement is needed, step 201 is performed to detect whether the terminal is in the inclined state. If the terminal is in the inclined state, the process of the angle measurement is started, and the angle measurement is performed by starting the camera. If the terminal is in the horizontal plane, the process of the angle measurement is not started.

In exemplary embodiment, to detect whether the terminal is in the inclined state, an inclined angle between the terminal and the horizontal plane is measured, and it is detected whether the inclined angle falls into a preset angle range. If it is detected that the inclined angle falls into the preset angle range, it is determined that the terminal is in the inclined state.

In exemplary embodiments, when detecting whether the terminal is in the inclined state, the terminal may start a gradienter APP installed on the terminal, and the inclined angle between the terminal and the horizontal plane is measured by the gradienter APP. The inclined angle refers to an angle for a display interface of the terminal to rotate along a bottom side or a lateral side of the terminal, from the display interface facing upward and being parallel with the horizontal plane to being in a current posture. For example, the inclined angle of the terminal may be measured by the gradienter APP according to various well known techniques.

In exemplary embodiments, after acquiring the inclined angle measured by the gradienter APP, the terminal compares the inclined angle with the preset angle range. If the inclined angle falls into the preset angle range, it is determined that the terminal is in the inclined state. If the inclined angle does not fall into the preset angle range, it is determined that the terminal is in the horizontal state. The angle range may be set and modified. For example, the angle range may be set between 45° and 135°, and may be modified to between 5° and 175°.

In step 202, a horizontal reference line, a measurement line, and the object being imaged by the camera are displayed on the display interface. For example, a plane determined by the measurement line and the horizontal reference line is parallel with the display interface, and the measurement line is relatively static with respect to the display interface.

In exemplary embodiments, the horizontal reference line is a reference line configured to indicate a horizontal direction and keeps horizontal. The measurement line is configured to measure an angle between an object and a horizontal plane, and is relatively static with respect to the display interface. There can be one or more measurement lines. In the illustrated embodiment, there is one measurement line.

Figure 2B:
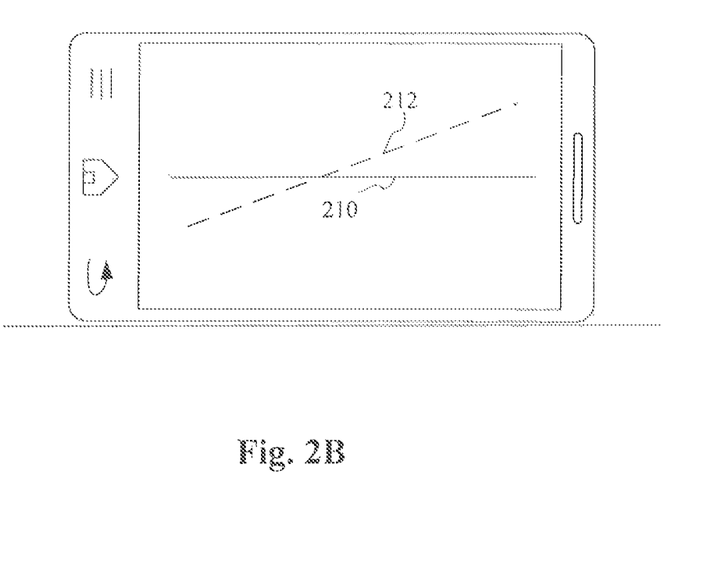
FIG. 2B is a schematic view showing a horizontal reference line and a measurement line, according to an exemplary embodiment.

In exemplary embodiments, the measurement line may be parallel with a long side of the terminal (e.g., the measurement line 112 in FIG. 1B (2)), or a short site of the terminal (e.g., the measurement line 112 in FIG. 1B (1)). The measurement line may also not be parallel with a long side or short side of the terminal, as shown in FIG. 2B, which is a schematic view showing a horizontal reference line 210 and a measurement line 212. In the embodiment in connection with FIG. 2B, the long side of the terminal is parallel with the horizontal plane and the measurement line 212 is not parallel with the long side of the terminal. Therefore, the measurement line 212 is not parallel with the horizontal reference line 210.

In exemplary embodiments, when the camera is in an ON state, the camera images the object in real time, and displays the object on the display interface.

Referring back to FIG. 2A, in step 203, during a process in which the terminal is turned to cause an edge of the object to be parallel with the measurement line, one or more angles between the measurement line and the horizontal reference line are obtained.

In exemplary embodiments, the measurement line is relatively static with respective to the display interface and the horizontal reference line keeps horizontal. Therefore, during the turning of the terminal, an angle is formed between the measurement line and the horizontal reference line, and the angle is measured by the gradienter APP in the illustrated embodiment.

In one exemplary embodiment, the measurement line is parallel with or coincident with the horizontal reference line at an initial moment. Accordingly, a rotating angle of the measurement line with respect to the horizontal reference line is measured, and the rotating angle is determined as the angle between the measurement line and the horizontal reference line.

In one exemplary embodiment, there is an initial angle between the measurement line and the horizontal reference line at the initial moment. Accordingly, the rotating angle of the measurement line with respect to the horizontal reference line is measured, an angle difference is calculated by subtracting the initial angle from the rotating angle, and the angle difference is determined as the angle between the measurement line and the horizontal reference line.

For example, if the measurement line is parallel with or coincident with the horizontal reference line at the initial moment, the rotating angle of the measurement line relative to the horizontal reference line is a rotating angle of the terminal relative to the horizontal plane. The gradienter APP may measure the rotating angle of the terminal relative to the horizontal plane, and the measured angle is determined as the angle between the measurement line and the horizontal reference line. Also for example, if there is an initial angle between the measurement line and the horizontal reference line at the initial moment, the gradienter APP acquires in advance the initial angle between the terminal and the horizontal plane before the user turns the terminal. Subsequently, the user turns the terminal, and stops turning of the terminal when the edge of the object being imaged by the camera is parallel with the measurement line on the display interface. The gradienter APP then measures the rotating angle between the terminal and the horizontal plane, and the angle between the measurement line and the horizontal reference line is calculated by subtracting the initial angle from the rotating angle.

In exemplary embodiments, to indicate a current rotating angle to the user, the gradienter APP measures the rotating angle at a predetermined interval, and displays the measured rotating angle on the display interface during the turning of the terminal.

In exemplary embodiments, the terminal determines that the edge of the object is parallel with the measurement line, if the terminal is held by the user at a certain position for a predetermined period. After the terminal detects that the terminal is held at a certain position for the predetermined period, the edge of the object is determined to be parallel with the measurement line, and the gradienter APP is triggered to calculate an angle. Alternatively, the terminal determines that the edge of the object is parallel with the measurement line, if the terminal receives a trigger signal from the user. When the terminal receives the trigger signal, the edge of the object is determined to be parallel with the measurement line, and the gradienter APP is triggered to calculate an angle. The trigger signal may be generated when a button provided on the display interface is clicked, or a predetermined touch operation on the display interface is performed, which is not limited in the present disclosure.

In step 204, an angle obtained when the edge is parallel with the measurement line is determined as an angle between the object and the horizontal plane.

For example, when the measurement line is parallel with the edge of the object, the angle between the measurement line and the horizontal reference line is the angle between the object and the horizontal plane. Thus, the terminal may determine the angle obtained when the edge of the object is parallel with the measurement line, as the angle between the object and the horizontal plane.

Figure 2C:
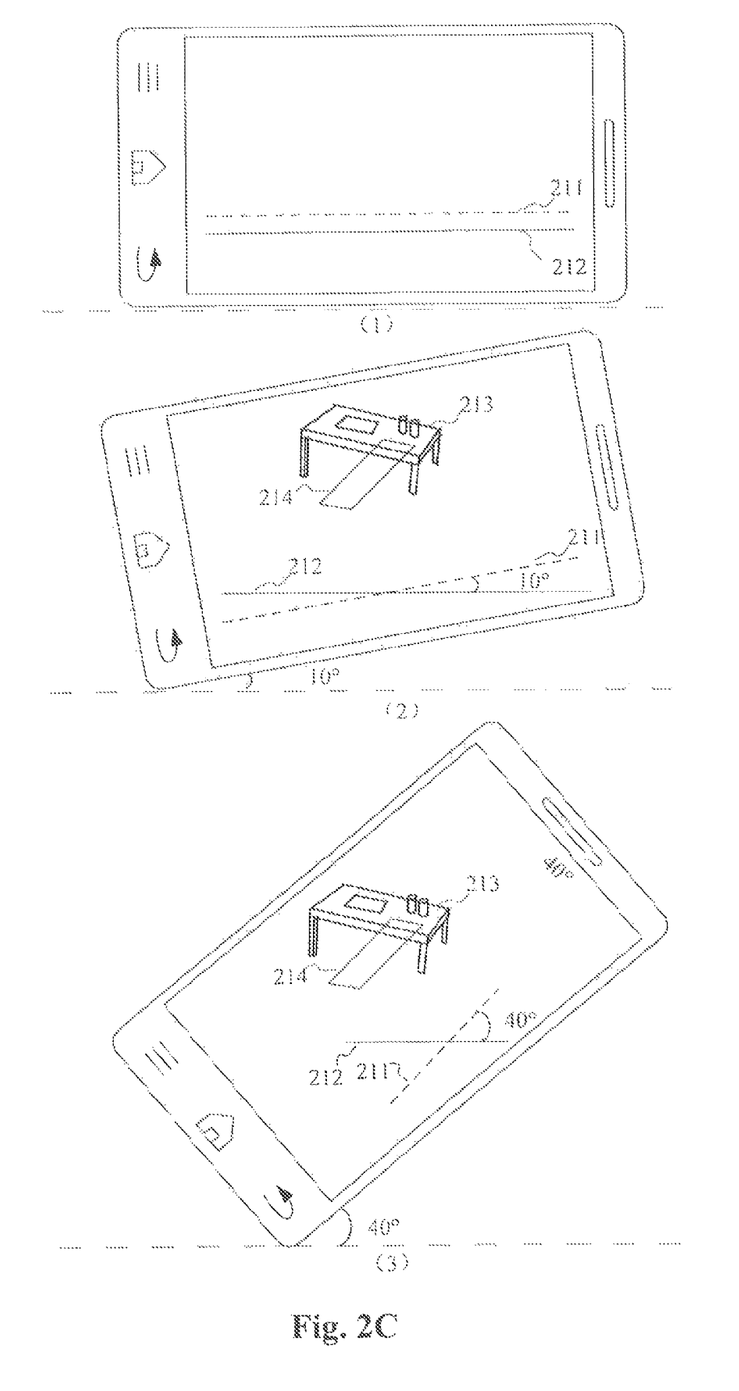
FIG. 2C shows schematic views of an angle measurement, according to an exemplary embodiment.

FIG. 2C is schematic views showing a measurement line 211 and a horizontal reference line 212 displayed on the display interface of the terminal, according to an exemplary embodiment. In the illustrated embodiment, the measurement line 211 is parallel with a long side of the terminal and the preset angle range is from 10° to 170°.

In exemplary embodiments, before the user turns the terminal to be aligned with an object to be measured, an angle between the terminal and the horizontal plane is 0<. Accordingly, the measurement line 211 and the horizontal reference line 212 are displayed parallel with each other on the display interface, as shown in FIG. 2C (1).

During a process in which the user turns the terminal to be aligned with the object to be measured, the angle between the terminal and the horizontal plane is measured by, e.g., the gradienter APP. When the angle between the terminal and the horizontal plane reaches 10°, which falls into the preset angle range from 10° to 170°, the terminal starts the camera, and displays the object imaged by the camera in real time, in addition to the measurement line 211 and the horizontal reference line 212. In the illustrated embodiment, it is assumed that the object to be measured is a plate 214 reclining against a table 213, and both are imaged by the camera, as shown in FIG. 2C (2).

When the user turns the terminal to cause an edge of the plate 214 to be parallel with the measurement line 211, an angle between the measurement line 211 and the horizontal reference line 212 is calculated to be 40° by, e.g., the gradienter APP. The 40° angle is determined as the angle between the plate 214 and the horizontal plane, and is displayed on the display interface, as shown in FIG. 2C (3).

In exemplary embodiments, the terminal measures an angle between first and second objects. For example, after the terminal performs steps 201 to 204 a first time to measure an angle for the first object, such as the plate 214, the terminal performs steps 201 to 204 a second time to measure an angle for the second object. To measure the angle for the second object, the terminal is turned to cause an edge of the second object to be parallel with the measurement line, and an angle between the measurement line and the horizontal reference line during the turning is obtained and displayed. When the edge of the second object is parallel with the measurement line, the angle is determined as an angle between the second object and the horizontal plane. An angle difference by subtracting the angle between the second object and the horizontal plane from the angle between the first object and the horizontal plane, and an absolute value of the angle difference is determined as the angle between the first object and the second object.

For example, if the measured angle between the first object and the horizontal plane is 49° when the terminal performs steps 201 to 204 for a first time, and the angle between the second object and the horizontal plane is 13° when the terminal performs steps 201 to 204 for a second time, the angle between the first object and the second object is determined to be 36°.

Figure 3:
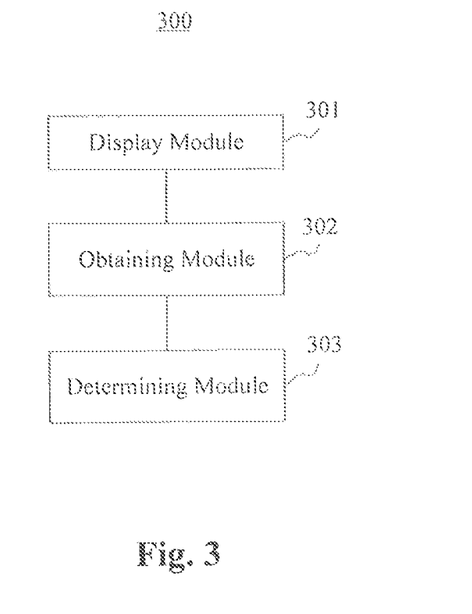
FIG. 3 is a block diagram of an apparatus for measuring an angle, according to an exemplary embodiment.

FIG. 3 is a block diagram of an apparatus 300 for measuring an angle according to an exemplary embodiment. The apparatus 300 may be a terminal including a camera, or a part of the terminal. Referring to FIG. 3, the apparatus 300 includes a display module 301, an obtaining module 302, and a determining module 303.

The display module 301 is configured to display a horizontal reference line, a measurement line, and an object being imaged by the camera on a display interface, a plane determined by the measurement line and the horizontal reference line being parallel with the display interface, and the measurement line being relatively static with respect to the display interface. The obtaining module 302 is configured to, during a process in which the terminal is turned to cause an edge of the object to be parallel with the measurement line, obtain an angle between the measurement line and the horizontal reference line. The determining module 303 is configured to determine an angle obtained by the obtaining module 302 when the edge is parallel with the measurement line, as an angle between the object and the horizontal plane.

Figure 4:
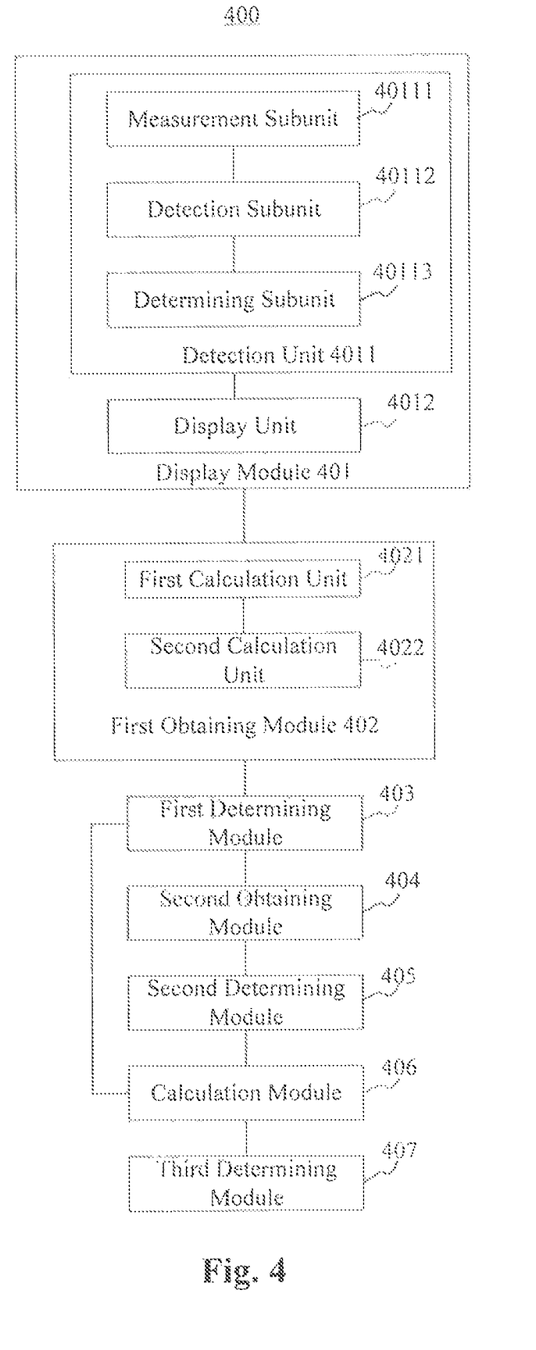
FIG. 4 is a block diagram of an apparatus for measuring an angle, according to an exemplary embodiment.

FIG. 4 is a block diagram of an apparatus 400 for measuring an angle, according to an exemplary embodiment. The apparatus 400 may be a terminal including a camera, or a part of the terminal. Referring to FIG. 4, the apparatus 400 includes a display module 401, a first obtaining module 402, and a first determining module 403.

The display module 401 is configured to display a horizontal reference line, a measurement line, and an object being imaged by the camera on a display interface, a plane determined by the measurement line and the horizontal reference line being parallel with the display interface, and the measurement line being relatively static with respect to the display interface. The first obtaining module 402 is configured to, during a process in which the terminal is turned to cause an edge of the object to be parallel with the measurement line, obtain an angle between the measurement line and the horizontal reference line. The first determining module 403 is configured to determine an angle obtained by the first obtaining module 402 when the edge is parallel with the measurement line as an angle between the object and the horizontal plane.

In exemplary embodiments, the display module 401 includes: a detection unit 4011 and a display unit 4012. The detection unit 4011 is configured to detect whether the terminal is in an inclined state. The display unit 4012 is configured to start the camera, and to display the horizontal reference line, the measurement line, and the object being imaged by the camera on the display interface, if the detection unit 4011 detects that the terminal is in the inclined state.

In exemplary embodiments, the detection unit 4011 includes a measurement subunit 40111, a detection subunit 40112 and a determining subunit 40113. The measurement subunit 40111 is configured to measure an inclined angle between the terminal and the horizontal plane. The detection subunit 40112 is configured to detect whether the inclined angle detected by the measurement subunit 40111 falls into a preset angle range. The determination subunit 40113 is configured to determine that the terminal is in the inclined state if it is detected that the inclined angle falls into the preset angle range.

In exemplary embodiments, the first obtaining module 402 includes a first calculation unit 4021 and a second calculation unit 4022. The first calculation unit 4021 is configured to, if the measurement line is parallel with or coincident with the horizontal reference line at an initial moment, measure a rotating angle of the measurement line in respect to the horizontal reference line, and to determine the rotating angle as the angle between the measurement line and the horizontal reference line. The second calculation unit 4022 is configured to, if there is an initial angle between the measurement line and the horizontal reference line at the initial moment, measure the rotating angle of the measurement line in respect to the horizontal reference line, calculate an angle difference by subtracting the initial angle from the rotating angle, and determine the angle difference as the angle between the measurement line and the horizontal reference line.

In exemplary embodiments, the apparatus 400 also includes a second obtaining module 404, a second determining module 405, a calculation module 406, and a third determining module 407.

The second obtaining module 404 is configured to, if the camera images a second object in addition to a first object, calculate an angle between the measurement line and the horizontal reference line during a process in which the terminal is turned to cause an edge of the second object to be parallel with the measurement line. The second determining module 405 is configured to determine an angle obtained by the second obtaining module 404 when the edge of another object is parallel with the measurement line as an angle between another object and the horizontal plane.

The calculation module 406 is configured to calculate an angle difference by subtracting the angle between the second object and the horizontal plane from the angle between the first object and the horizontal plane. The third determination module 407 is configured to determine an absolute value of the angle difference as the angle between the first object and the second object.

Figure 5:
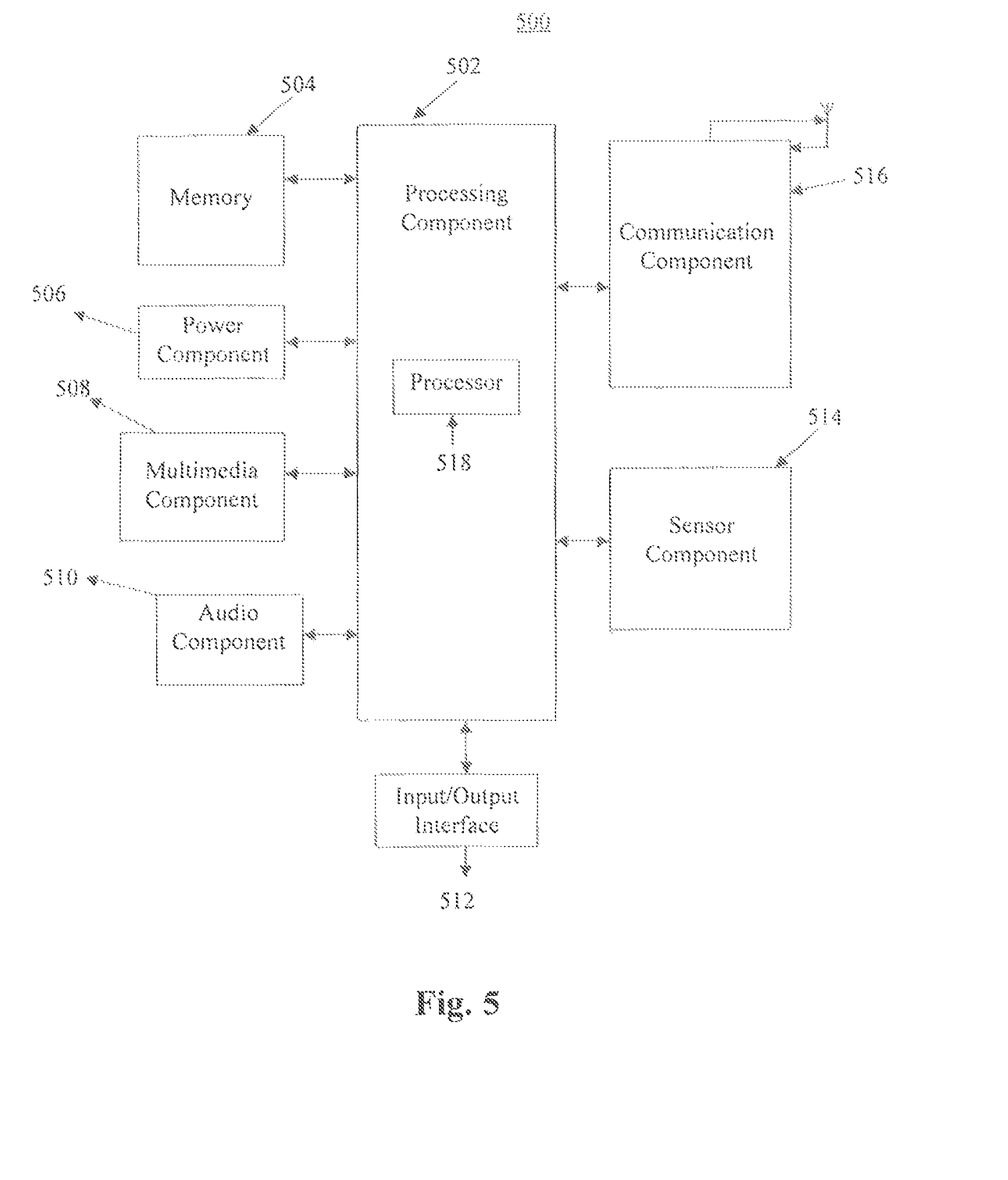
FIG. 5 is a block diagram of a device for measuring an angle, according to an exemplary embodiment.

FIG. 5 is a block diagram of a device 500, according to an exemplary embodiment. The device 500 is configured to perform the above described methods for measuring an angle. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor pressure sensor temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 518 in the device 500, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method performed by a mobile terminal to measure an angle of an object, comprising:
displaying, on a display interface of the mobile terminal, a horizontal reference line and a measurement line relatively static with respect to the display interface, the measurement line and the horizontal reference line determining a plane parallel with the display interface;
detecting whether the mobile terminal is in an inclined state;
when it is detected that the mobile terminal is in the inclined state, starting a camera of the mobile terminal and imaging the object via the camera;
displaying the object on the display interface;
during a process in which the mobile terminal is turned to cause, on the display interface, an edge of the object to be parallel with the measurement line, obtaining one or more angles between the measurement line and the horizontal reference line;
determining an angle obtained when the edge of the object is parallel with the measurement line as an angle between the object and a horizontal plane; and
displaying the determined angle on the display interface.

2. The method according to claim 1, wherein the detecting of whether the mobile terminal is in an inclined state comprises:
measuring an inclined angle between the mobile terminal and the horizontal plane;
detecting whether the inclined angle falls into a preset angle range; and
if it is detected that the inclined angle falls into the preset angle range, determining that the mobile terminal is in the inclined state.

3. The method according to claim 1, wherein the obtaining of a first angle of the one or more angles between the measurement line and the horizontal reference line comprises:
if the measurement line is parallel with or coincident with the horizontal reference line at an initial moment, measuring a rotating angle of the measurement line with respect to the horizontal reference line, and determining the rotating angle as the first angle between the measurement line and the horizontal reference line; and
if there is an initial angle between the measurement line and the horizontal reference line at the initial moment, measuring the rotating angle of the measurement line with respect to the horizontal reference line, calculating an angle difference by subtracting the initial angle from the rotating angle, and determining the angle difference as the first angle between the measurement line and the horizontal reference line.

4. The method according to claim 2, wherein the obtaining of a first angle of the one or more angles between the measurement line and the horizontal reference line comprises:
if the measurement line is parallel with or coincident with the horizontal reference line at an initial moment, measuring a rotating angle of the measurement line with respect to the horizontal reference line, and determining the rotating angle as the first angle between the measurement line and the horizontal reference line; and
if there is an initial angle between the measurement line and the horizontal reference line at the initial moment, measuring the rotating angle of the measurement line with respect to the horizontal reference line, calculating an angle difference by subtracting the initial angle from the rotating angle, and determining the angle difference as the first angle between the measurement line and the horizontal reference line.

5. The method according to claim 1, wherein the object is a first object and, when the camera images a second object, the method further comprising:
during a process in which the mobile terminal is turned to cause, on the display interface, an edge of the second object to be parallel with the measurement line, obtaining one or more angles between the measurement line and the horizontal reference line;
determining an angle obtained when the edge of the second object is parallel with the measurement line as an angle between the second object and the horizontal plane;
calculating an angle difference by subtracting the angle between the second object and the horizontal plane from the angle between the first object and the horizontal plane; and
determining an absolute value of the angle difference as an angle between the first object and the second object.

6. A mobile terminal, comprising:
a camera;
a display interface;
a processor; and
a memory configured to store instructions executable by the processor;
wherein the processor is configured to:
display, on the display interface, a horizontal reference line and a measurement line relatively static with respect to the display interface, the measurement line and the horizontal reference line determining a plane parallel with the display interface;
detect whether the mobile terminal is in an inclined state;
when it is detected that the mobile terminal is in the inclined state, start the camera and control the camera to image an object;
display the object on the display interface;
during a process in which the terminal is turned to cause, on the display interface, an edge of the object to be parallel with the measurement line, obtain one or more angles between the measurement line and the horizontal reference line;
determine an angle obtained when the edge of the object is parallel with the measurement line as an angle between the object and a horizontal plane; and
display the determined angle on the display interface.

7. The mobile terminal according to claim 6, wherein the processor is further configured to:
measure an inclined angle between the mobile terminal and the horizontal plane;
detect whether the inclined angle falls into a preset angle range; and
if it is detected that the inclined angle falls into the preset angle range, determine that the mobile terminal is in the inclined state.

8. The terminal according to claim 6, wherein the processor is further configured to:
if the measurement line is parallel with or coincident with the horizontal reference line at an initial moment, measure a rotating angle of the measurement line with respect to the horizontal reference line, and determine the rotating angle as a first one of the one or more angles between the measurement line and the horizontal reference line; and
if there is an initial angle between the measurement line and the horizontal reference line at the initial moment, measure the rotating angle of the measurement line with respect to the horizontal reference line, calculate an angle difference by subtracting the initial angle from the rotating angle, and determine the angle difference as the first one of the one or more angles between the measurement line and the horizontal reference line.

9. The terminal according to claim 7, wherein the processor is further configured to:
if the measurement line is parallel with or coincident with the horizontal reference line at an initial moment, measure a rotating angle of the measurement line with respect to the horizontal reference line, and determine the rotating angle as a first one of the one or more angles between the measurement line and the horizontal reference line; and
if there is an initial angle between the measurement line and the horizontal reference line at the initial moment, measure the rotating angle of the measurement line with respect to the horizontal reference line, calculate an angle difference by subtracting the initial angle from the rotating angle, and determine the angle difference as the first one of the one or more angles between the measurement line and the horizontal reference line.

10. The terminal according to claim 6, wherein the object is a first object and, when the camera images a second object, the processor is further configured to:
during a process in which the mobile terminal is turned to cause, on the display interface, an edge of the second object to be parallel with the measurement line, obtain one or more angles between the measurement line and the horizontal reference line;
determine an angle obtained when the edge of the second object is parallel with the measurement line as an angle between the second object and the horizontal plane;
calculate an angle difference by subtracting the angle between the second object and the horizontal plane from the angle between the first object and the horizontal plane; and
determine an absolute value of the angle difference as an angle between the first object and the second object.

11. A non-transitory computer-readable storage medium having stored therein instructions that, when executed by a processor of a mobile terminal, cause the mobile terminal to perform a method for measuring an angle of an object, the method comprising:
displaying, on a display interface of the mobile terminal, a horizontal reference line and a measurement line relatively static with respect to the display interface, the measurement line and the horizontal reference line determining a plane parallel with the display interface;
detecting whether the mobile terminal is in an inclined state;
when it is detected that the mobile terminal is in the inclined state, starting a camera and controlling the camera to image the object;
displaying the object on the display interface;
during a process in which the terminal is turned to cause, on the display interface, an edge of the object to be parallel with the measurement line, obtaining one or more angles between the measurement line and the horizontal reference line;
determining an angle obtained when the edge of the object is parallel with the measurement line as an angle between the object and a horizontal plane; and
displaying the determined angle on the display interface.

12. The non-transitory computer-readable storage medium according to claim 11, wherein the detecting of whether the mobile terminal is in an inclined state comprises:
measuring an inclined angle between the mobile terminal and the horizontal plane;
detecting whether the inclined angle falls into a preset angle range; and
if it is detected that the inclined angle falls into the preset angle range, determining that the mobile terminal is in the inclined state.

13. The non-transitory computer-readable storage medium according to claim 11, wherein the obtaining of a first angle of the one or more angles between the measurement line and the horizontal reference line comprises:
if the measurement line is parallel with or coincident with the horizontal reference line at an initial moment, measuring a rotating angle of the measurement line with respect to the horizontal reference line, and determining the rotating angle as the first angle between the measurement line and the horizontal reference line; and
if there is an initial angle between the measurement line and the horizontal reference line at the initial moment, measuring the rotating angle of the measurement line with respect to the horizontal reference line, calculating an angle difference by subtracting the initial angle from the rotating angle, and determining the angle difference as the first angle between the measurement line and the horizontal reference line.

14. The non-transitory computer-readable storage medium according to claim 11, wherein the object is a first object and, when the camera images a second object, the method further comprises:
during a process in which the mobile terminal is turned to cause an edge of the second object to be parallel with the measurement line, obtaining one or more angles between the measurement line and the horizontal reference line;
determining an angle obtained when the edge of the second object is parallel with the measurement line as an angle between the second object and the horizontal plane;
calculating an angle difference by subtracting the angle between the second object and the horizontal plane from the angle between the first object and the horizontal plane; and
determining an absolute value of the angle difference as an angle between the first object and the second object.

* * * * *